May 23, 1933.    H. J. L. FRANK    1,910,686
MOTOR CONTROL UNIT
Filed Sept. 8, 1930    4 Sheets-Sheet 1

INVENTOR.
BY Harrison J. L. Frank
Francis D Hardesty
ATTORNEY.

May 23, 1933. H. J. L. FRANK 1,910,686
MOTOR CONTROL UNIT
Filed Sept. 8, 1930 4 Sheets-Sheet 2

INVENTOR.
BY Harrison J. L. Frank
Francis D. Hardesty.
ATTORNEY.

May 23, 1933.                H. J. L. FRANK                1,910,686
                            MOTOR CONTROL UNIT
                          Filed Sept. 8, 1930            4 Sheets-Sheet 4

INVENTOR.
BY Harrison J. L. Frank
Francis D. Hardesty.
ATTORNEY.

Patented May 23, 1933

1,910,686

UNITED STATES PATENT OFFICE

HARRISON J. L. FRANK, OF DETROIT, MICHIGAN, ASSIGNOR TO BULLDOG ELECTRIC PRODUCTS COMPANY, OF DETROIT, MICHIGAN, A CORPORATION OF WEST VIRGINIA

MOTOR CONTROL UNIT

Application filed September 8, 1930. Serial No. 480,463.

This invention relates to motor control units and more particularly to switching units for motor supply lines.

There has been developed, in recent years, a motor having a D. C. winding and an A. C. winding, the motor being started by energization of the D. C. winding and being run by energization of the A. C. winding. It is the practice, in operation of these motors, to first energize the D. C. winding and then to energize the A. C. winding, at the same time deenergizing the D. C. winding. Accordingly it has become advisable to provide for the line or supply switches, means to insure the proper sequence of winding energization and automatically to do what should be done with the line or supply circuits.

An object of this invention, therefore, is a unit having a D. C. switch, an A. C. switch, and means interlocking said switches whereby closing of the A. C. switch until and unless the D. C. switch is closed, is prevented.

A further object is a unit having a D. C. outlet and an A. C. outlet, and means for preventing insertion of the D. C. line in the A. C. outlet and vice versa.

A still further object is a unit having a D. C. outlet and an A. C. outlet, and means for insuring plugging into the D. C. outlet before the A. C. outlet is plugged in.

A still further object is a novel form of switch, one that is patterned after the switch disclosed in U. S. Patent 1,733,370, granted to Harrison J. L. Frank, Oct. 29, 1929, but that in the "off" position, as well as in the "on" position, conceals the contacts, unlike the one disclosed in the patent, which in the "off" position, exposes the contacts.

An even further object is a novel form of switch plug having a handle which, by its position, indicates whether the switch plug be in its "on" or its "off" position.

Still further objects are units having D. C. receptacles, outlets, wires, etc. A. C. receptacles, outlets, wires, etc., and carrier plates for separating the D. C. parts from the A. C. parts, thus preventing confusion, commingling, etc. between them.

Still further objects are novel forms of interlocks between switches adapted to be interlocked, one or more of the forms including parts adapted to project into the paths of insertion of the switch plugs to control and/or to be controlled by the insertion of such plugs.

Still further objects are novel forms of fused plug and receptacle switches, forms including novel details of manufacture, permitting easy installation and economical and compact manufacture.

Still further objects will readily occur to those skilled in the art upon reference to the following description and the accompanying drawings in which Fig. 1 is a front view of the device, a door being open, and is a view as if in the direction of the arrow 1 of Fig. 2.

Fig. 2 is a side view of the device.

Figs. 3 and 5 are back views of plugs, as if in the direction of the arrows 3 and 5 of Figs. 4 and 6.

Figure 1:
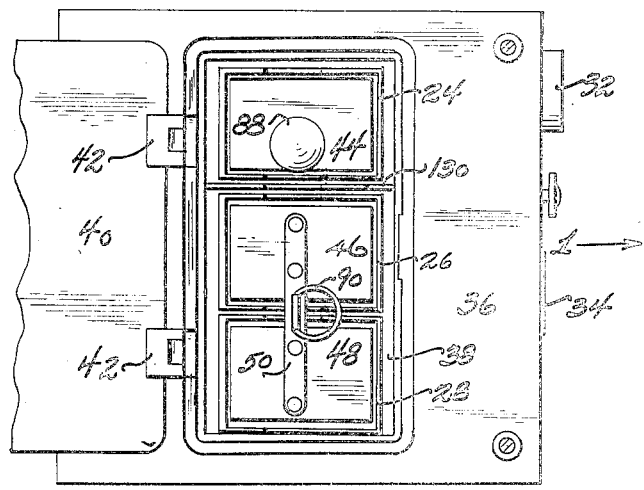

As indicated on the drawings, the motor control unit includes a sheet metal casing 20 in which and to the bottom 22 of which are secured a plurality of cup shaped receptacles 24, 26 and 28, and to the side 30 of which are secured a plurality of outlets 32 and 34. The open front of the casing 20 is closed by a front masking plate 36, whose aperture 38 is alined with the openings of the receptacles 24, 26 and 28, and is adapted to be closed by the cover plate 40 mounted on the hinges at 42.

Disposed within the receptacles 24, 26 and 28 are the plugs 44, 46 and 48, the plugs 46 and 48 being mechanically connected by the strap 50 which serves to so combine them as to create a double branch plug 46—48 for purposes to be described. The plugs are provided with fuse clips 52—54—56—58—60—62 adapted to receive fuses (shown diagrammatically) and to the fuse clips are connected blades 64, 66, 68, 70, 72 and 74 which are adapted to cooperate with the similarly positioned contacts 76, 78, 80, 82, 84 and 86 in the receptacles 24, 26 and 28, and which serve to connect contacts 76—78, 80—82, 84—86 to each other thru the fuses, the plugs being provided with handles 88 and 90 to facilitate their insertion and removal. Further, in each of the receptacles there is disposed an insulating sheet 92 having bent up portions 94 adapted to shield the adjacent receptacle contacts.

Figure 12:
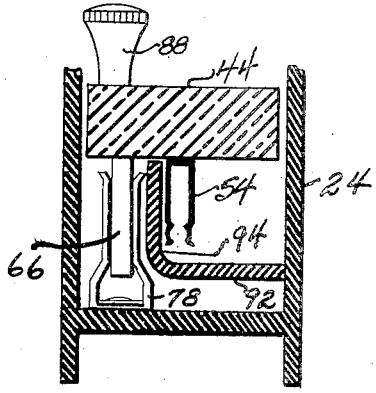
Figs. 12 and 13 are diagrammatic views showing the plug and receptacle cooperation, of a modification.
Figure 13:
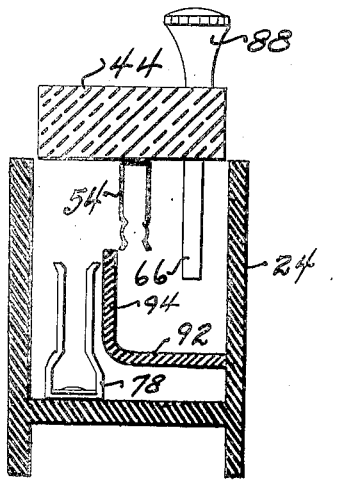

Referring to the modification of Figs. 12 and 13, wherein the clip 54 is disposed adjacent the prong 66, it will be observed that the plugs and receptacle contacts are so disposed that when a plug 44 is inserted in a receptacle 24 in one position, the contacts 52, 54, 76 and 78 will mutually engage, but that when the plug is rotated, in its own plane, 180 degrees, the plug may be inserted in the receptacle with the contacts separated and shielded from one another by a shield 94. Further, since the plug handle 88 is assymmetrically disposed on the plug, its position will vary and will indicate whether the plug be in the circuit closing or circuit opening position in the receptacle.

The previously mentioned outlets 32 and 34 are of the terminal plug receiving type, outlet 32 having three contacts (not shown) and three apertures 102 in its face to receive a three prong plug, outlet 34, however, having only two apertures 104 for a plug of the two contact type.

Figure 15:
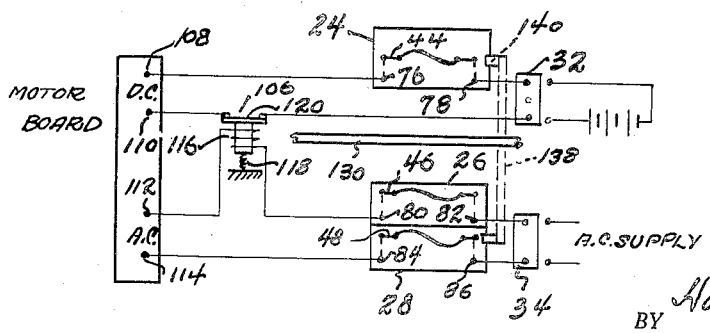
Fig. 15 shows the wiring and use of the device.

Two of these contacts of outlet 32 are connected as follows, (Fig. 15), one to contact 78, and one to a relay 106, a connection being made between the contact 76 and motor contact 108. The three pronged plug which cooperates with the outlet 32 has two of its prongs connected to the terminals of a storage battery or other D. C. supply, its other prong being unconnected as is the corresponding contact of the outlet 32. A connection is also made between the remote side of the relay 106 and the motor contact 110, as shown.

The two contacts of outlet 34, to which A. C. supply is brought by the cooperating plug, are connected to contacts 82 and 86 respectively, and the contacts 80 and 84 are connected to the contacts 112 and 114 of the motor connection board, the connection from contact 80 being made thru the coil 116 of the relay 106, energization of the coil serving to draw down against the spring 118 the armature 120 which bridges the gap in the line between the D. C. supply and the motor board contact 110, It will be observed that with plugs 44, 46 and 48 in place in their receptacles, D. C. supply brought to outlet 32 will be fed to the D. C. windings of the motor (not shown) to be controlled, and that A. C. supply brought to the outlet 34 will be fed to the A. C. windings of the motor (not shown). Further, it will be apparent that when the A. C. circuit is energized, the relay coil 116 will operate to break the D. C. supply circuit, deenergizing the D. C. windings of the motor.

It has been found necessary in the use of devices of this character to provide means to insure the prevention of the energization of the A. C. windings, unless and until the D. C. windings of the motor have been energized, and accordingly several such means have been provided, for various conditions.

Figure 2:
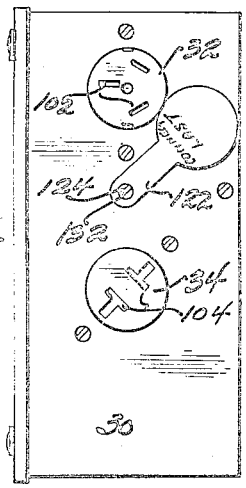
Figure 3:
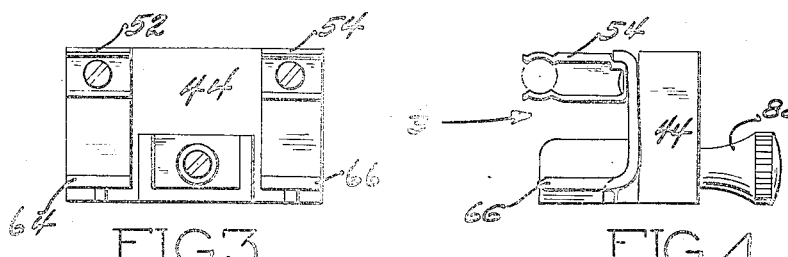
Figure 4:
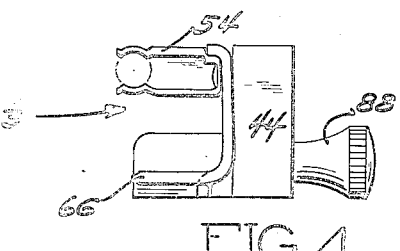
Figs. 4 and 6 are side views of the device.
Figure 5:
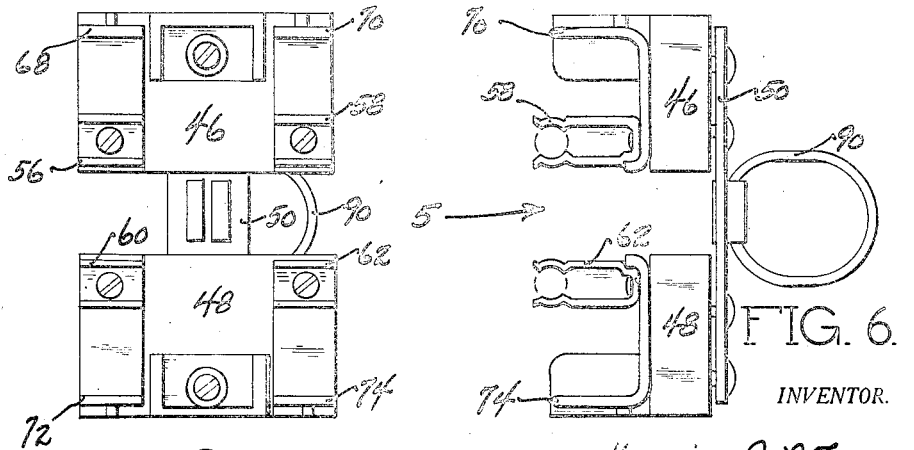
Figure 6:
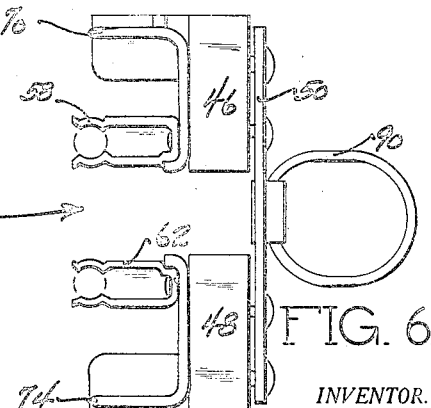
Figure 7:
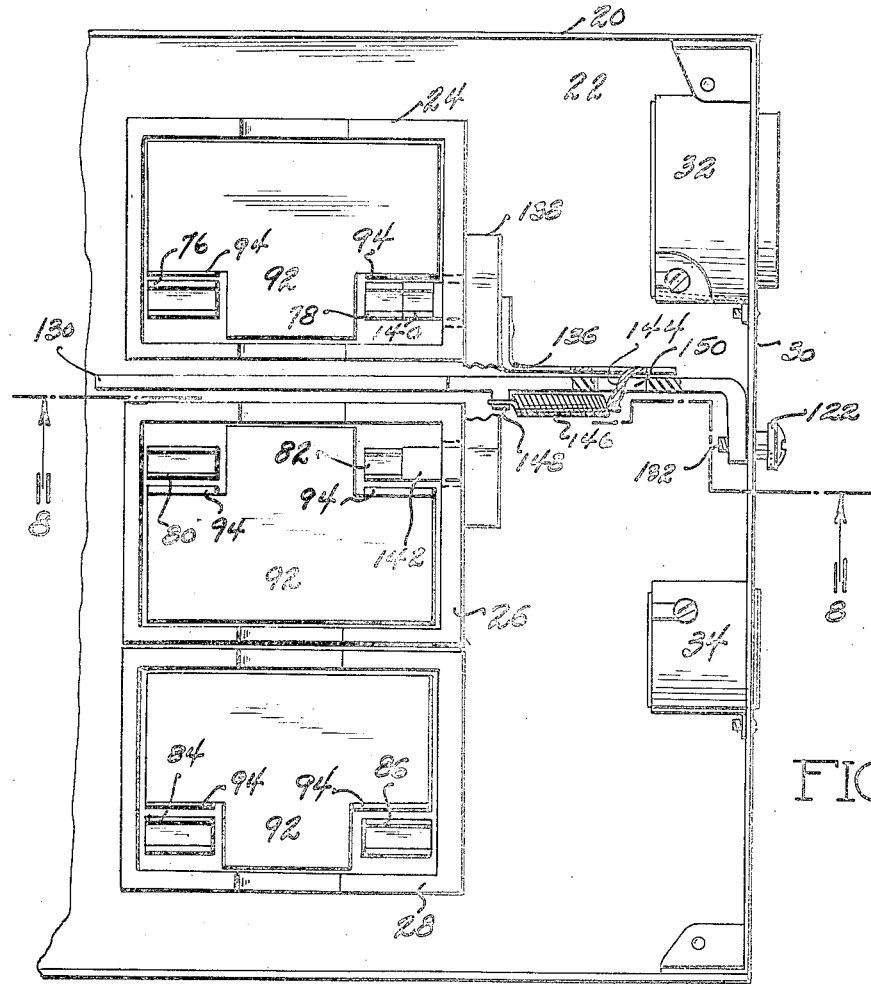
Fig. 7 is a partial front view of the device, a masking plate having been omitted.
Figure 8:
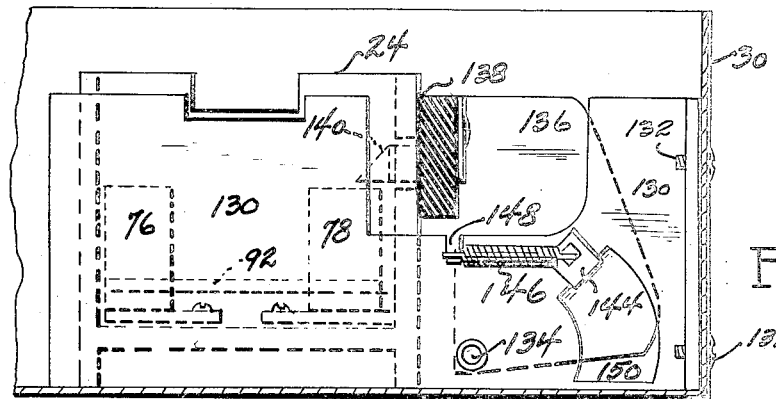
Fig. 8 is a view in section as if on the line 8—8 of Fig. 7.
Figure 9:
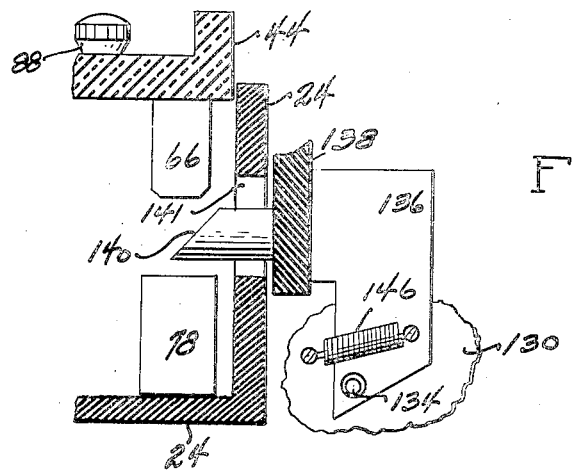
Figs. 9, 10 and 11 are diagrammatic views showing the interlock.
Figure 10:
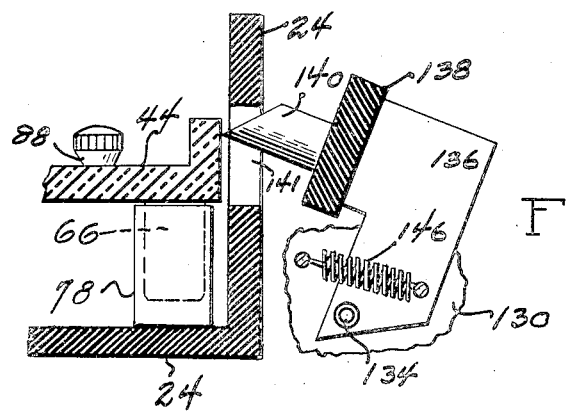
Figure 11:
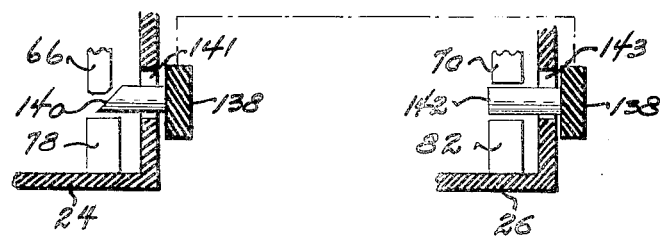

Referring to Fig. 2, there is shown a fiber element 122 which is pivotally mounted at 124 so that it normally occupies such a position that it conceals and covers the outlet 34. The element bears the inscription "Connect last", and accordingly warns the user not to plug the A. C. supply into the outlet 34 until the D. C. supply has been plugged into the outlet 32. In this manner, an impositive interlock is provided to prevent energization of the A. C. coil until the D. C. coil has been energized. Further, by virtue of the difference in spacing between the prong receiving openings in the outlets, it will be impossible for the user to plug the A. C. supply into outlet 32, and the D. C. supply into outlet 34.

A positive form of interlock between the circuits, and operating in the receptacles 24 and 26 is also provided. Disposed between the receptacles 24 and 26 is a barrier plate 130 which is secured to the side 30 by the screw 132. The barrier plate has pivotally mounted thereon at 134, a second plate 136, the latter carrying a bar 138 of insulating material, the bar bridging the receptacles 24 and 26, and carrying stop elements 140 and 142 which normally project thru apertures 141—143 in the side walls of the receptacles to positions immediately above the contacts 78 and 82. A lug 144 struck outwardly from the plate 136 has secured to it one end of a coiled tension spring 146, the other end being secured to a lug 148 bent from the barrier plate 130, spring 146 constantly serving to project the elements into their position above the contacts 78 and 82. The plate 130 is slotted as at 150 to provide a path in which moves the lug 144, and the upper end of the slot forms a stop to limit movement of the interlocking parts.

Element 140 projecting above contact 78 is wedge shaped, while element 142 is left blunt. Accordingly, when plug 44 is inserted into receptacle 24, with its contact 66 in line with receptacle contact 78, contact 66 will engage element 140 forcing it, and all parts secured to it, backwardly, or until element 142 no longer projects above the contact 82. But, since element 142 is blunt and not wedge shaped, it cannot be moved back by and upon insertion of plug 46 and contact 70 carried thereby, and moreover, since element 142 is blunt, it prevents the insertion of contact 70 into contact 82, and of plug 46 into receptacle 26. Accordingly, it is obvious that insertion of the plugs closing the A. C. lines unless and until the plugs closing the D. C. lines have been inserted is impossible, and that a positive interlock, insuring the proper order of circuits closing, is provided.

Figure 14:
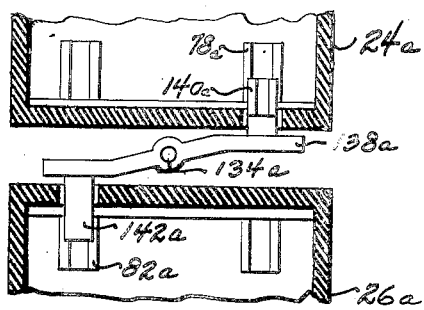
Fig. 14 shows a modification of the interlock, diagrammatically.

In Fig. 14 there is shown a modified form of interlock, one wherein the contacts 78A and 82A are displaced relatively to the contacts 78 and 82 and wherein the bar 138A, carrying the wedge shaped element 140A and blunt element 142A, is pivotally mounted as at 134A between the receptacles 24A and 26A, the axis of pivotal mounting being parallel to the axis of insertion of the plugs (not shown). It will be seen that when a plug is inserted into receptacle 24A the wall contact carried thereby will force the wedge shaped element 140A out of the receptacle, causing bar 130A to rotate on its axis at 134A, and withdrawing element 140A from receptacle 26A.

Further, it will be apparent that other forms of interlocking devices may be employed, such as sliding bars, lugs rotating in their own plane, etc. without departing from the spirit of the invention. Further, it will be observed that barrier plate 130, besides supporting the interlocking parts, also serves as a means to separate all D. C. parts (32—24—44, etc.) and their connecting wires from all A. C. parts (34—26—46—28—48, etc.) and their connecting wires, preventing confusion and commingling therebetween.

Accordingly, it will be seen that there has been provided a motor control unit capable of performing all of the functions necessary in devices of this character, and that all of the previously described objects may be accomplished by the unit described and disclosed herein.

Now having described the invention and the preferred embodiment thereof, it is to be understood that the said invention is to be limited, not to the specific details herein set forth, but only by the scope of the claims which follow:

1. A control unit including a single pole receptacle and a double pole receptacle, plugs for closing circuit lines running thru said receptacles, and an interlock for preventing closing of said double pole receptacle line unless and until said single pole receptacle line has been closed, said interlock including a pair of connected elements, each projecting into the path of insertion of one of said plugs, one of said elements being wedge shaped whereby it may be moved by said single pole plug, upon insertion of the latter.

2. A control unit including a single pole receptacle and a double pole receptacle, plugs for closing circuit lines running thru said receptacles, and an interlock for preventing closing of said double pole receptacle line unless and until said single pole receptacle line has been closed, said interlock including a pair of connected elements, each projecting into the path of insertion of one of said plugs, one of said elements being wedge shaped whereby it may be moved by said single pole plug, upon insertion of the latter, the other of said elements being so shaped as to prevent insertion of said double pole plug when it, the element, is in the receptacle.

3. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, one of said elements being wedge shaped whereby it may be moved upon insertion of the plug with which it co-operates.

4. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, one of said elements being wedge shaped whereby it may be moved upon insertion of the plug with which it cooperates.

5. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar between the receptacles.

6. A control unit including a large area housing containing a small area single pole receptacle and a small area double pole receptacle, the receptacles being side by side and opening towards the front of the unit, plugs for closing circuit lines running thru said receptacles, and an interlock for preventing closing of said double pole receptacle line unless and until said single pole receptacle line has been closed, the housing being provided with a barrier outside of and between said receptacles whereby the wires leading to one of them cannot be commingled with the wires leading to the other of them, said barrier serving also as a means to support and guide said interlock, 7. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, one of said elements being wedge shaped whereby it may be moved upon insertion of the plug with which it cooperates.

8. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, said bar being normally spring held in such a position that the elements are in position to be engaged by said plug, one of said elements being wedge shaped whereby it may be moved upon insertion of the plug with which it cooperates.

9. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, the mounting of said bar including a barrier plate between said receptacles upon which said bar is mounted, said plate and bar having a lug and slot connection whereby the bar is guided on the plate in its movement.

10. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, the mounting of said bar including a barrier plate between said receptacles upon which said bar is mounted.

11. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, the mounting of said bar including a barrier plate between said receptacles upon which said bar is mounted, said plate and bar being connected by a spring which tends to maintain the bar in such position that its elements are in position to be engaged by the plugs.

12. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, the mounting of said bar including a barrier plate between said receptacles upon which said bar is mounted, said plate and bar having a lug and slot connection whereby the bar is guided on the plate in its movement, said plate and bar being connected by a spring which tends to maintain the bar in such a position that its elements are in position to be engaged by the plugs.

13. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, the mounting of said bar including a barrier plate between said receptacles upon which said bar is mounted, said plate and bar having a lug and slot connection whereby the bar is guided on the plate in its movement, the lug being on a part integrally attached to said bar, the slot being in said plate.

14. In combination, a pair of receptacles, a pair of plugs insertable therein, and an interlock device for preventing insertion of one of the plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, the mounting of said bar including a barrier plate between said receptacles upon which said bar is mounted, said plate and bar having a lug and slot connection whereby the bar is guided on the plate in its movement, the lug being on a part integrally attached to said bar, the slot being in said plate, the lug also serving as a spring support.

15. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar bridging the receptacles, the mounting of said bar including a barrier plate between said receptacles upon which said bar is mounted, said plate and bar having a lug and slot connection whereby the bar is guided on the plate in its movement, the lug being on a part integrally attached to said bar, the slot being in said plate, the lug also serving as a spring support and as a stop for preventing over travel of the bar.

16. In combination, a pair of receptacles, a pair of plugs insertable therein, and an interlock device for preventing insertion of one of said plugs unless and until the other of said plugs has been inserted in its receptacle, said interlock including a pair of connected elements projecting into the paths of insertion of said plugs, said elements being rigidly mounted on a pivotally mounted insulating bar between the receptacles, the axis of the pivotal mounting being parallel to the axis of insertion of the plugs.

17. A control unit including separate and independent receptacles, separate and independent plugs for closing circuit lines running thru said receptacles, and an interlock structurally independent of the plugs for preventing closing of one of said lines unless and until the other receptacle line has been closed, said interlock including means normally in the path of insertion of one of the plugs and movable, by and upon plugging-in insertion of the other plug out of the path of insertion of the first mentioned one of the plugs, whereby to permit plugging-in insertion of the latter.

18. In a control device, a plurality of separate and independent switching units for separate and independent circuit lines, each of which comprises a receptacle containing contacts and a plug having contacts for mating with the receptacle contacts to close the circuit lines through the units, and an interlock means for preventing plugging in of one of said plugs unless and until the other of said plugs has been plugged in, said plugs being structurally independent of one another, of said receptacles, and of the interlock means, and being transportable away from said receptacles.

HARRISON J. L. FRANK.